United States Patent [19]
Raynor

[11] 3,707,869
[45] Jan. 2, 1973

[54] AIRBORNE ISOKINETIC SAMPLER

[75] Inventor: Gilbert S. Raynor, Manorville, N.Y.

[73] Assignee: The United States of America as represented by the United States Atomic Energy Commission

[22] Filed: June 9, 1971

[21] Appl. No.: 151,402

[52] U.S. Cl. .................................73/28, 73/421.5 R
[51] Int. Cl. ...........................G01n 1/24, B01d 46/00
[58] Field of Search.73/28, 170 R, 421.5 R, 421.5 H; 244/1 R

[56] References Cited

UNITED STATES PATENTS

| | | |
|---|---|---|
| 2,468,021 | 4/1949 | Black.....................................73/28 X |
| 2,645,941 | 7/1953 | Reid...................................73/170 R X |
| 3,059,470 | 10/1962 | Baldwin et al. .....................73/170 R |
| 3,309,518 | 3/1967 | Weiss ...................................73/28 X |

Primary Examiner—Richard C. Queisser
Assistant Examiner—C. E. Snee, III
Attorney—Roland A. Anderson

[57] ABSTRACT

A lightweight airborne isokinetic sampler employing a sampling head mounted on a track and connected by flexible hose to the air-moving and controlling equipment located within the aircraft. Flow of air is controlled by a coaxial valve and a bleed-in valve. A pitot tube is used to measure air flow.

3 Claims, 2 Drawing Figures

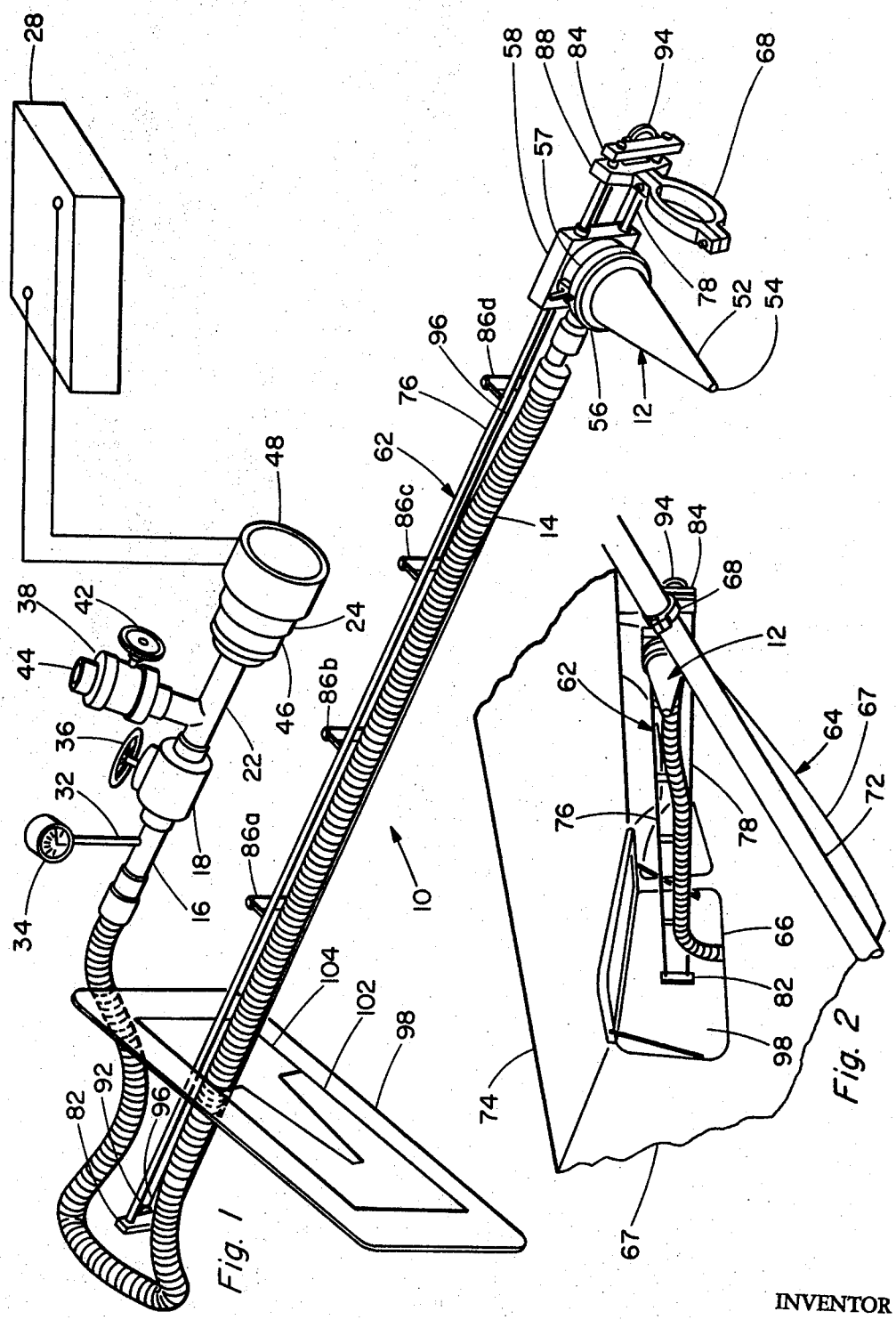

AIRBORNE ISOKINETIC SAMPLER

SOURCE OF THE INVENTION

The invention described herein was made in the course of, or under a contract with, the United States Atomic Energy Commission.

BACKGROUND OF THE INVENTION

During recent years, there has been increasing interest in the condition of our atmosphere, especially as to the presence of polluting products being discharged by power plants, industrial complexes, and the like.

One of the problems involved in the control of the discharge of these products is that of monitoring the atmosphere for its particulate content in order to know which products should be of real concern. While sampling techniques for ground or near ground level have been developed to an advanced state, the sampling of the atmosphere at altitudes from 100 M to about 3 KM has remained a difficult problem. For example, the collection of air samples at any altitude can be readily accomplished but in the situation where the investigator is concerned with particulate content of the sample, accurate and representative samples of heterodisperse particulates will not be obtained unless the collection is carried out in such a way as not to disturb or alter the kinetics of the air flow during collection. That is, if the air stream velocity at entrance to a sampler is changed abruptly, then the particulates trapped in the sampler will not be truly representative.

Isokinetic sampling has long been recognized as the only way to obtain accurate and representative samples of this type. By isokinetic sampling is meant the taking of samples with minimum disturbance of the lines of flow so as to get a true and representative sample of the particulate suspended. That is, the kinetics of the gas are not disturbed.

Attempts in the past to accomplish this in the range of altitudes mentioned have usually resulted in something less than the most desirable results. Balloon mounted devices are capable of taking samples of only limited areas, and this procedure is slow and inefficient, as well as awkward to carry on in an urban area. Aircraft mounted devices are preferred because of the greater efficiency, more accurate results as to location, and greater number of samples which can be obtained in a given period of time. Unfortunately, up to now, it has been difficult, if not impossible, to obtain isokinetic sampling from a light aircraft in the altitudes of greatest interest. Isokinetic sampling systems which have been developed heretofore are heavy and bulky, requiring the use of heavy aircraft, such as those systems described in "An aircraft Impactor for Determining the Size Distributions of Tropospheric Aerosols," W. L. Torgenson and S. C. Stern, Journal of Applied Meteorology, April 1966, pp 205–209.

SUMMARY OF THE INVENTION

The present invention relates to an isokinetic sampler capable of being carried by a light aircraft for obtaining accurate samples of heterodisperse particulate matter in the lower atmosphere. The sampler head is operated in undisturbed air under the wing and is drawn into the cabin along a track for changing filters. A battery-powered, high volume sampler in the cabin serves as the air moving device. The sampler can draw as much as 0.72 $m^3 min^{-1}$ and match aircraft speeds to 38 $ms^{-1}$ at standard temperature and pressure, and can be used for measuring the vertical distribution of a variety of particulates including airborne pollens and industrial air pollutants and for determining their size distribution and composition.

BRIEF DESCRIPTION OF THE DRAWING

FIG. 1 is a partial schematic of a preferred embodiment of the airborne isokinetic sampling system of this invention;

FIG. 2 illustrates a typical mounting aboard a light aircraft.

DESCRIPTION OF THE PREFERRED EMBODIMENT

Referring to FIG. 1, airborne isokinetic sampling system 10 consists of a sampling head 12 connected by way of a flexible hose 14 to a rigid pipe 16 which leads into a flow control valve assembly 18, another stretch of rigid pipe 22, and a high volume sampler 24. A 24 volt D.C. power pack 28 supplies electrical power for sampler 24.

Pipe 16 is provided with a pilot tube 32 connected to a differential pressure gage 34. As is understood in the art, the end of pitot tube extending into pipe 16 is turned with its opening facing the flow of air, the pressure gage 34 showing the static pressure developed inside the pitot tube, indicating with proper calibration the volume rate of flow of the air within pipe 16 which is the volume rate of flow through the whole system.

Flow control valve assembly 18 is a conventional globe valve with a hand-operated dial 36 for throttling the flow of air through system 10.

Extending from pipe 22 is a bleeder valve assembly 38 with a hand-operated dial 42 for permitting and controlling the amount of air which is permitted to be bled into the system, for reasons which will later be apparent. Valve assembly 38 also uses a conventional globe valve with an entrance 44 to the air.

High volume sampler 24 consists of a rotary blower 46 of any suitable type driven by a motor 48 at a constant rate. The latter is energized by battery power pack 28. Blower 46 discharges to air.

Sampling head 12 consists of a conical entry cone 52 with entry 54 at its narrowest diameter and connected at its largest diameter to a cylindrical filter holder 56. Cone 52 may be threadably or otherwise readily engaged and disengaged to holder 56, clamping a filter ring 57 carrying a circular, flat filter to collect particulate in the air passing through sampling head 12, and flexible hose 14. Holder 56 is mounted on a slide 58 for a purpose to be described below.

Before completing the description of FIG. 1, reference is made to FIG. 2 for the purpose of indicating how system 10 is mounted for use. There it will be seen that a frame 62 supports sampling head 12 on light aircraft 64. The latter would be typically a single engine single wing aircraft which cruises at air speeds of 60 to 85 mph (27 to 38 $ms^{-1}$). Support frame 62, which extends out of window 66 of fuselage 67, is supported at its extended end by a clamp 68 mounted on spar 72. A wing mount, using a bracket extending from wing 74, could also be used for attachment by clamp 68.

Referring to both figures, it is seen that support frame 62 consists of pair of spaced, parallel rails 76 and 78 supported at their ends by blocks 82 and 84, respectively, and held together by spacer elements such as 86*a*, 86*b*, 86*c*, and 86*d*. Clamp 68 is supported by a block 88 mounted on rails 76 and 78. Slide 58 which supports sampler head 12 is mounted for movement along rails 76 and 78. Thus, with frame 62 in place, sampler head 12 could be retracted when not in use or to replace the filter. Flexible hose 14 permits this movement.

In order to effect movement of head 12, end blocks 82 and 84 are provided with pulleys 92 and 94, respectively, on which is wound an endless cable 96. Cable 96 is attached to slide 58 so that the operator within aircraft 64 can retract or extend head 12 by merely rotating pulley 92 by hand. A replacement plastic window pane 98 with a slide closure 102 and an opening 104 may be inserted within open window 66 to help support one end of frame 62.

In the operation of the apparatus described, with frame 62 mounted on a light aircraft as shown in FIG. 2, a filter is placed within sampler 12 which is then moved along tracks 76 and 78 out to its position shown for collection, by rotating pulley 92. Sampler 24 is then started, and during the course of operation, it pumps at a constant rate. In order to obtain isokinetic sampling, however, it is necessary to adjust the air flow through sampling system 10 such that the air entering sampling head 52 is disturbed as little as possible. That is, the lines of flow of the air immediately in front of opening 54 remain unchanged. By manipulating valves 18 and 38, flow is regulated such that gage 34 shows a pressure differential corresponding to the preselected flow rate. For a particular aircraft speed a particular flow rate is required to achieve isokinetic sampling. Valves 18 and 38 must be adjusted to obtain this reading on gage 34.

If initially gage 34 indicates excessive flow, then valve 38 is opened to reduce the reading on gage 34 to the desired level. If fully opening of valve 38 does not achieve this result, then valve 18 is throttled to reduce the gage reading further.

If initially gage 34 indicates insufficient flow, valve 18 is opened until correct flow is obtained. Should more flow be required with valve 18 fully open, then valve 38 is throttled.

It is understood that the end of rails 76 and 78 along with block 82 within aircraft 64 may be supported or held in any convenient manner and that the assembly connected to hose 14 at the remote end from sampling head 12 is located within fuselage 67 as indicated in FIG. 2. Also, it is readily apparent that divergent section 52 should be aligned axially with the axis of motion of the aircraft with entrance 54 facing the direction of motion. With regard to slide 58, slots in the rear aligned with rails 76 and 78 are provided to accommodate the supports for spacer elements 86*c*, 86*b*, etc.

With respect to opening 54, its size is as understood in the art a function of air speed (i.e., aircraft velocity) and the pumping rate of sampler 24.

It will be seen that the arrangement described herein is useful in the sampling of heterodisperse particulate matter found in the lower atmosphere. The arrangement, being light in weight and simple to manage, can be used with small aircraft so that the cost of its use is relatively low. It is also apparent that the simplicity of its construction makes it reliable and easy to maintain.

I claim:

1. An isokinetic sampling system for air-borne particulate matter for use with a light aircraft comprising:

a. sampling head means comprising a divergent section having an entrance thereto and a supporting section for receiving flow from said divergent section;

b. track means extending from the body of said aircraft for supporting said sampling head means with said divergent section aligned with the axis of motion of said aircraft and said entrance facing the direction of motion, said track means having means controlled from within said aircraft for selectively extending and retracting said sampling head means;

c. flexible tube means connected at one end to said supporting section for receiving air entering said divergent section and extending into said aircraft;

d. pumping means connected at its suction side to receive air from said flexible tube means entering and flowing from said divergent section, said pumping means operative at a constant volumetric rate of flow;

e. filter means within said supporting section for removing particulate matter from air passing therethrough; and f. control means between said flexible tube means and the suction side of said pumping means for regulating the flow of air entering said sampling head means to maintain isokinetic flow conditions at the entrance to said divergent section.

2. The sampling system of claim 1 in which said control means includes means for indicating volumetric air flow through said system, and valve means for altering flow of air into said divergent section.

3. The sampling section of claim 2 in which said valve means includes a throttle valve downstream of said indicating means to adjustably throttle the flow of air in said system and a bleed valve downstream of said throttle valve at the suction side of said pumping means for adjustably permitting air to enter said system bypassing said system downstream of said throttle valve.

* * * * *